(12) United States Patent
Sugiura et al.

(10) Patent No.: US 10,780,547 B2
(45) Date of Patent: Sep. 22, 2020

(54) MACHINE TOOL

(71) Applicant: OKUMA Corporation, Niwa-gun Aichi (JP)

(72) Inventors: Hiroyuki Sugiura, Niwa-gun Aichi (JP); Shoichi Morimura, Niwa-gun Aichi (JP)

(73) Assignee: OKUMA CORPORATION, Niwa-Gun Aichi (JP)

( * ) Notice: Subject to any disclaimer, the term of this patent is extended or adjusted under 35 U.S.C. 154(b) by 330 days.

(21) Appl. No.: 15/959,723

(22) Filed: Apr. 23, 2018

(65) Prior Publication Data

US 2018/0304440 A1    Oct. 25, 2018

(30) Foreign Application Priority Data

Apr. 21, 2017   (JP) ................. 2017-084712

(51) Int. Cl.
| | |
|---|---|
| *B24B 41/06* | (2012.01) |
| *B24B 57/02* | (2006.01) |
| *B24B 5/00* | (2006.01) |
| *B24B 55/12* | (2006.01) |
| *B24B 5/04* | (2006.01) |

(52) U.S. Cl.
CPC ............. *B24B 41/06* (2013.01); *B24B 5/00* (2013.01); *B24B 5/045* (2013.01); *B24B 41/061* (2013.01); *B24B 55/12* (2013.01); *B24B 57/02* (2013.01)

(58) Field of Classification Search
CPC .......... B24B 41/06; B24B 45/00; B24B 5/00; B24B 41/061; B24B 55/12; B24B 57/02

USPC ......................................... 451/278, 451–457
See application file for complete search history.

(56) References Cited

U.S. PATENT DOCUMENTS

| | | | | |
|---|---|---|---|---|
| 959,830 | A | * | 5/1910 | Alden et al. ............. A43D 8/34 69/16 |
| 2,711,061 | A | * | 6/1955 | Fegert .................... B24B 55/06 451/456 |
| 3,596,413 | A | * | 8/1971 | Stewart ................ B24B 53/007 451/444 |

(Continued)

FOREIGN PATENT DOCUMENTS

| | | |
|---|---|---|
| JP | 62148101 A | 7/1987 |
| JP | 01210256 A | 6/1989 |

(Continued)

*Primary Examiner* — George B Nguyen
(74) *Attorney, Agent, or Firm* — Cantor Colburn LLP

(57) ABSTRACT

A machine tool includes a main shaft unit; a polishing head for processing a workpiece; and an unnecessary byproduct leakage preventing unit for preventing leakage of abrasive resulting from processing at or around a part of the workpiece, the part being processed, and wherein the unnecessary byproduct leakage preventing unit includes a cover provided separately from the polishing head, the cover having a structure that is open in three directions and that has walls in another three directions such that a protection space where to hold a part of the workpiece is defined, the cover for receiving the abrasive, and a movement mechanism for moving the cover so as to stay apart from the workpiece while the workpiece is not being processed and so as to have a part of the workpiece held in the protection space while the workpiece is being processed.

11 Claims, 5 Drawing Sheets

(56) References Cited

U.S. PATENT DOCUMENTS

| | | | | |
|---|---|---|---|---|
| 4,120,121 A * | 10/1978 | Surman | ............... | B24B 55/12 451/28 |
| 4,208,844 A * | 6/1980 | Suzuki | ............... | B24B 55/045 125/11.19 |
| 4,280,689 A * | 7/1981 | Frosch | ............... | B24B 13/005 118/50 |
| 4,671,708 A * | 6/1987 | Hurd | ............... | B23Q 11/006 15/345 |
| 4,677,718 A * | 7/1987 | Babel | ............... | B23Q 11/08 29/33 P |
| 5,649,508 A * | 7/1997 | Rost | ............... | A47L 11/03 15/29 |
| 5,951,388 A * | 9/1999 | Parsons | ............... | B23Q 11/0071 451/451 |
| 6,299,393 B1 * | 10/2001 | Anders | ............... | B23F 17/003 409/12 |
| 6,315,651 B1 * | 11/2001 | Kuo | ............... | B24B 37/34 451/443 |
| 6,470,778 B1 * | 10/2002 | Kaye, Jr. | ............... | B23D 59/006 144/252.1 |
| 6,824,459 B1 * | 11/2004 | Suquitana | ............... | B24B 55/12 30/124 |
| 7,334,971 B2 * | 2/2008 | Benedetti | ............... | B23Q 11/0046 408/67 |
| 2002/0119739 A1 * | 8/2002 | Parillo | ............... | B24B 27/02 451/178 |
| 2003/0031086 A1 * | 2/2003 | Shikami | ............... | B01F 15/0412 366/160.2 |
| 2003/0199231 A1 * | 10/2003 | Rogmark | ............... | A47L 15/0094 451/36 |
| 2008/0202568 A1 * | 8/2008 | Benner | ............... | B24B 53/017 134/198 |
| 2011/0017030 A1 * | 1/2011 | Chambers | ............... | B24B 27/065 83/13 |

FOREIGN PATENT DOCUMENTS

| | | |
|---|---|---|
| JP | 2002160139 A | 6/2002 |
| JP | 2003211341 A | 7/2003 |
| JP | 2005125472 A | 5/2005 |

* cited by examiner

MACHINE TOOL

CROSS REFERENCE TO RELATED APPLICATION

The present application claims priority under 35 U.S.C. § 119 to Japanese Patent Application No. 2017-084712 filed on Apr. 21, 2017, the entire content of which is incorporated herein by reference.

TECHNICAL FIELD

This specification describes a machine tool including a workpiece holder that holds a workpiece and a processing head that processes the workpiece held by the workpiece holder.

BACKGROUND

Machine tools that process workpieces are widely known. In processing with such a tool, particular unnecessary byproducts, such as wastes or directed-energy, can be generated at or around a part being processed. Particular unnecessary byproducts include, for example, processing wastes removed from a workpiece being processed, abrasive grains separated from a grindstone, a cutting liquid or abrasive supplied to and around a workpiece for processing, and laser radiation deviated and leaked from a workpiece. Such particular unnecessary byproducts, if left alone, will impede normal operation of a machine tool and render collected materials incapable of being re-used. For example, in a multi-tasking machine, or a machine tool having a polishing head built in a lathe, if abrasive is left scattering and leaking in a polishing process, the abrasive can enter the movement mechanism of the machine tool and abrade sliding or other members. This can cause water leakage to the sliding portion and deteriorate processing precision. Meanwhile, in a machine tool having a movable cover, such as a telescopic cover, that protects a movement mechanism, abrasive can abrade a sliding portion of the telescopic cover. This can cause water leakage or swarf deposited on the sliding surface. Further, the sliding resistance of the telescopic cover may increase, and a catch, if caused, can destroy the telescopic cover. Furthermore, if abrasive is left leaking, the abrasive can be blended into the cutting liquid, rendering the cutting liquid incapable of being re-used.

In view of the above, a technique for preventing scattering of swarf resulting from a cutting processing has been conventionally suggested. For example, Patent Document 1 describes a device having a cover formed surrounding a tool and having an opening at a position closer to an object to be processed. Such a device can prevent scattering of swarf to some extent, as swarf will unlikely go outside the cover. Patent Document 2 discloses a similar device.

Patent Document 3 discloses a swarf suction head having a cylindrical head in communication with a suction duct. The head body has a first opening formed along its axis and a second opening formed on its circumferential surface, wherein the first opening is for a tool to penetrate therethrough, and the second opening is for a workpiece to penetrate therethrough. Turning processing is executed with a workpiece in the second opening and a tool in the first opening. This structure as well can prevent scattering of swarf to some extent, as swarf will unlikely go outside the head.

CITATION LIST

Patent Document 1: JP 2002-160139 A
Patent Document 2: JP 2003-211341 A
Patent Document 3: JP 2005-125472 A In the case of a tool having a cover formed around the tool, as in Patent Documents 1 and 2, the cover is subjected to restriction in changing its position and posture relative to the tool or a workpiece, as the cover moves together with the tool. As a result, the cover cannot fully prevent swarf scattering. Moreover, formation of a cover around a tool makes the tool bulky. This restricts movement of the tool, decreasing the degree of freedom in processing.

In Patent Document 3, it is necessary to insert a workpiece into the round opening (the second opening) formed in the circumferential surface of the head body from the tip end of the workpiece. This requirement makes the head body not usable with a workpiece having a large projection and/or recession thereon. For example, assume a workpiece whose tip end portion has a small diameter and whose middle portion in the axial direction has a large diameter. To process this workpiece, the second opening (the round opening) should have a larger diameter than that of the middle portion of the workpiece in its axial direction. When the second opening has a large diameter, a large gap will result relative to the tip end portion (a portion having a smaller diameter) of the workpiece in its axial direction, which likely generates swarf. That is, the head body shaped as described in Patent Document 3 suffers from limitation in shape of workpieces that can be processed by the head body.

As described above, to date there is no conventional technique that can effectively prevent leakage of particular unnecessary byproducts resulting from processing without deteriorating the performance of the processing. This specification discloses a machine tool that can effectively prevent leakage of particular unnecessary byproducts resulting from processing without deteriorating the performance of the processing.

SUMMARY

The machine tool described in this specification includes: a workpiece holder for holding a workpiece; a processing head for processing the workpiece held by the workpiece holder; and an unnecessary byproduct leakage preventing unit for preventing leakage of a particular unnecessary byproduct that is a waste or directed-energy resulting from processing at or around a part of the workpiece, the part being processed, and wherein the unnecessary byproduct leakage preventing unit includes a cover provided separately from the processing head, the cover having a structure that is open in three directions and that has walls in three other directions such that a protection space where the workpiece is to be held is defined, the cover for receiving the particular unnecessary byproduct, and a movement mechanism for moving the cover so as to stay apart from the workpiece while the workpiece is not processed and so as to have a part of the workpiece held in the protection space while the workpiece is being processed.

The movement mechanism may include a drive source that is different from a drive source for the workpiece and a drive source for the processing head and move the cover, interlocking with movement of the processing head, while the workpiece is being processed.

The workpiece holder may hold one or both respective end portions of the workpiece in an axial direction of the workpiece, the processing head may approach the workpiece substantially in a radial direction of the workpiece, and the movement mechanism may cause the cover to approach the workpiece substantially in the radial direction of the workpiece such that the cover is positioned substantially opposed to the processing head with the workpiece in-between.

The cover may have any of a substantially U-shaped cross section, a substantially V-shaped cross section, and a substantially inverted C-shaped cross section.

The unnecessary byproduct leakage preventing unit may have an elastic member provided to the cover and to be closely adhered to the part of the work, the part being held in the protection space.

The particular unnecessary byproduct may include at least one of a processing waste removed from the workpiece being processed, and a processing aid that is liquid or powder particles supplied to the workpiece and therearound for processing. In this case, the unnecessary byproduct leakage preventing unit may further include an injection mechanism for injecting fluid from a space between the cover and the workpiece or a space between the cover and the processing head to inside the protection space to thereby prevent leakage of the particular unnecessary byproduct from the space. The particular unnecessary byproduct may be liquid or powder particles blended in liquid, and the unnecessary byproduct leakage preventing unit may further include a liquid collecting mechanism for collecting liquid received by the cover.

The machine tool may be a multi-tasking machine including a processing head built in a lathe, the processing head for polishing or grinding a workpiece, the lathe for turning the workpiece, the processing head may be a polishing head for holding a polishing tool for polishing the workpiece or a grinding head for holding a grindstone for grinding the workpiece, and the particular unnecessary byproduct may be abrasive supplied for polishing or abrasive grains removed from the grindstone. In this case, the movement mechanism may move the cover with at least four degrees of freedom including straight movements in a Z axial direction in parallel with a workpiece main shaft, an X axial direction orthogonal to the Z axial direction, and a Y axial direction orthogonal to the Z axial direction and the X axial direction, and rotation movement around an axis in parallel with at least one of the X axial direction, the Y axial direction, and the Z axial direction.

The movement mechanism may be a multiple-joint robot mounted in a processing chamber.

ADVANTAGEOUS EFFECTS OF INVENTION

According to the machine tool described in this specification, the cover for receiving particular unnecessary byproducts is provided separately from the processing head. This prevents the tool from becoming bulky and improves the degree of freedom of movement for the tool. Further, as the cover is open in three directions, the cover can be used with workpieces in various shapes. As a result, it is possible to effectively prevent leakage of particular unnecessary byproducts resulting from processing without deteriorating performance in processing.

BRIEF DESCRIPTION OF DRAWINGS

Embodiment(s) of the present disclosure will be described by reference to the following figures, wherein.

DESCRIPTION OF EMBODIMENTS

Figure 1:
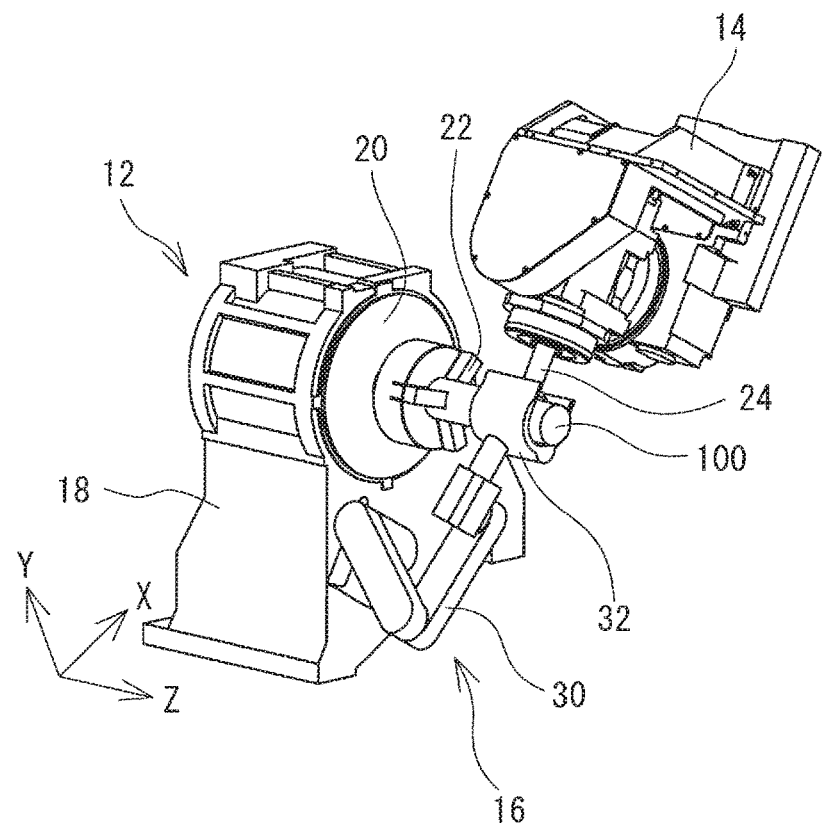
FIG. 1 is a perspective view of a major part of a machine tool.
Figure 2:
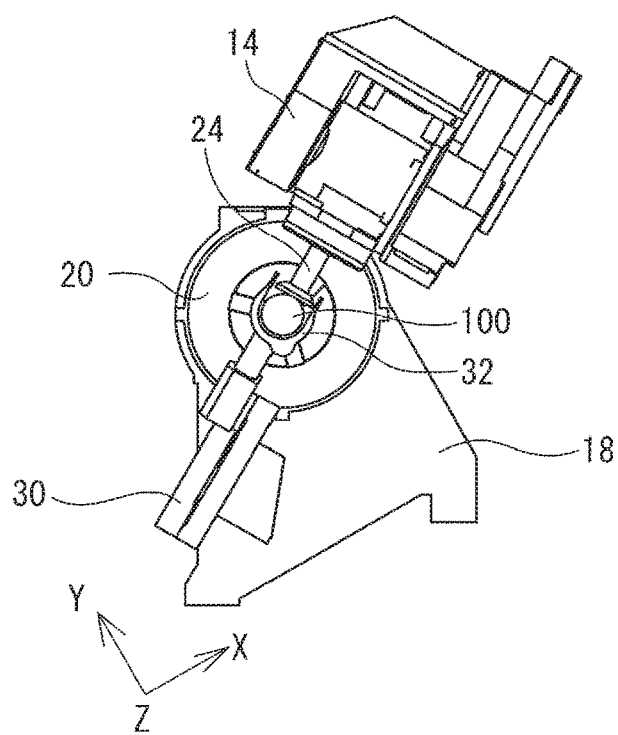
FIG. 2 illustrates a major part of a machine tool viewed in the Z axial direction.
Figure 3:
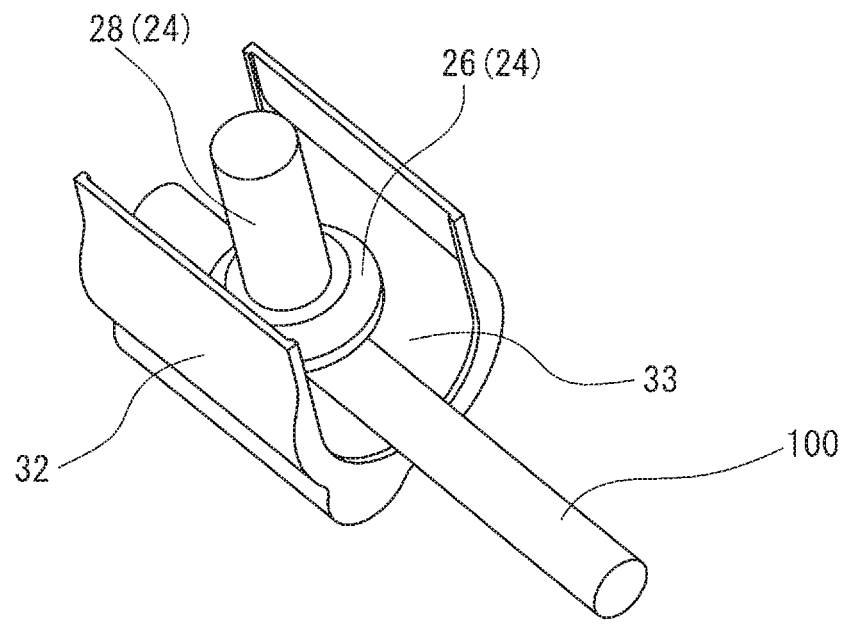
FIG. 3 is a perspective view of a cover, a polishing tool, and a workpiece.

The following describes a structure of a machine tool with reference to the drawings. FIG. 1 is a perspective view of a major part of a machine tool. FIG. 2 illustrates the major part of the machine tool viewed in the Z axial direction. FIG. 3 is a perspective view of a cover 32, a polishing tool 24, and a workpiece 100 to be described later. In the description below, the Z axial direction is a direction in parallel with the rotation axis of a workpiece main shaft 20, and two directions orthogonal to the Z axial direction are the X axial direction and the Y axial direction, respectively.

FIG. 1 and FIG. 2 illustrate a machine tool that is a multi-task machine having a polishing head 14 (a processing head) for polishing, the polishing head 14 built in a lathe. This machine tool has a main shaft unit 12 for holding a workpiece 100, a tool post (not illustrated) for holding a turning tool, the polishing head 14 for holding a polishing tool 24, and an unnecessary byproduct leakage preventing unit 16 for preventing leakage of particular unnecessary byproducts resulting from a polishing process. The main shaft unit 12 functions as a workpiece holder. The main shaft unit 12 has a head stock 18 that incorporates a drive motor or the like and the workpiece main shaft 20 mounted on the head stock 18. The workpiece main shaft 20 has a collet or a chuck 22 for removably holding one end of the workpiece 100 so that a workpiece 100 to be held can be desirably changed. The workpiece main shaft 20 and the chuck 22 rotate by themselves around the rotation axis extending in the horizontal direction (the Z axial direction in FIG. 1). The workpiece holder may additionally have a tailstock or the like for holding the other end of the workpiece 100 besides the main shaft unit 12.

The tool post holds a turning tool called a cutting tool, or a bite. The tool post can move in the Z and X respective axial directions while being driven by a drive motor. In turning the workpiece 100, the workpiece 100 is kept rotating by the main shaft unit 12, and the turning tool held by the tool post is brought into contact with the workpiece 100 and turns the workpiece 100.

The polishing head 14 holds the polishing tool 24 for polishing the workpiece 100. The polishing head 14 as well has a drive motor and can move in the Z and X respective axial directions independent of the tool post. During a turning process, the polishing head 14 moves to a position without interference with the tool post and the workpiece 100 and remains there. During a polishing process, the tool post moves to a position without interference with the polishing head 14 and the workpiece 100 and remains there.

The polishing head 14 can rotate the polishing tool 24 held around its longitudinal axis. Specifically, as illustrated in FIG. 3, the polishing tool 24 has a buff 26 shaped like a substantially round panel and a tool shaft 28 connected to the buff 28. In polishing the workpiece 100, the workpiece 100 is held with the end face of the buff 28 pressed onto the circumferential surface of the workpiece 100 and then rotated by the main shaft unit 12 and the polishing tool 24 is also rotated by the polishing head 14. In the above, abrasive is supplied in advance or during the polishing process to the workpiece 100 so as to be present between the workpiece 100 and the polishing tool 24. Abrasive is a paste of high hardness particles or powder with added oil.

Abrasive on the workpiece 100 or the polishing tool 24 can scatter around and leak while the workpiece 100 and the polishing tool 24 are rotating. Such abrasive leakage, if left alone, will lead to deterioration in processing precision and impede reuse of the cutting liquid. Specifically, a movement mechanism that moves the tool post or the polishing head 14 (a guide member such as a sliding portion or a linear guide, a ball screw, and a rolling bearing for supporting the ball screw) is typically mounted in an area (hereinafter referred to as a "movement mechanism area") that is different from a processing area where processing is executed and separated from the processing area by a telescopic cover. Although the telescopic cover normally does not pass chips or the like resulting from a cutting process, the telescopic cover may pass abrasive particles, which are very fine. Abrasive particles having passed through the telescopic cover can be disposed on a sliding member and abrade a part of the sliding member, which deteriorates accuracy in movement and precision in processing. Abrasive, even not passing through the telescopic cover, can abrade a sliding member of the telescopic cover, which can lead to water leakage and/or chips disposed on a sliding surface. Additionally, the sliding resistance of the telescopic cover can increase, and a catch, if caused, can destroy the telescopic cover.

Here, the cutting liquid supplied in a turning process is collected in a lower portion of the machine tool to be used again as desired. If the abrasive leakage is left as it is, the abrasive can be blended into the collected cutting liquid. Abrasive once blended into the cutting liquid is hardly separated from the cutting liquid, thus rendering the collected cutting liquid incapable of being re-used.

To address the above, the machine tool described in this specification has a unit for preventing leakage of abrasive, or particular unnecessary byproducts resulting from processing, or an unnecessary byproduct leakage preventing unit 16. The unnecessary byproduct leakage preventing unit 16 includes a cover 32 disposed near the workpiece 100 (near a part being processed) and a movement mechanism 30 that moves the cover 32. During a non-processing period with polishing processing not executed, the movement mechanism 30 maintains the cover 32 apart from the workpiece 100. During a polishing process, on the other hand, the movement mechanism 30 moves the cover 32 to a position close to the workpiece 100. Although any machine that can move the cover 32 to a desired position is usable without limitation as the movement mechanism 30, the movement mechanism 30 is desirably capable of not only moving the cover 32 but also changing the posture of the cover 32. That is, desirably, the movement mechanism 30 can move straight in the three respective axial directions and rotate around at least one axis. In other words, desirably, the movement mechanism 30 has at least four degrees of freedom. In FIG. 1 and FIG. 2, the movement mechanism 30 is a multiple-joint robot having a plurality of arms connected via joints to each other and mounted in a processing chamber (the head stock 18 in the example illustrated). Alternatively, the movement mechanism 30 may be of another type of mechanism, such as, for example, a mechanism including an XYZ table and a rotation table combined or a parallel-link mechanism, instead of a multiple-joint robot.

As illustrated in FIG. 2 and FIG. 3, the cover 32 is a member having a substantial U-shape. That is, the cover 32 is a member that is open in three directions and that has walls in another three directions. In other words, the cover 32 has a shape resembling a halved cylinder. The space defined by the walls in three directions forms a protection space 33 where a part of the workpiece 100 is to be held.

As illustrated in FIG. 2, in a polishing process, the movement mechanism 30 moves the cover 32 to a position near the workpiece 100 so that a part of the workpiece 100 is held in the protection space 33. In the above, the cover 32 is positioned substantially opposed to the polishing tool 24 with the workpiece 100 in-between. This disposition has the wall constituting the cover 32 present in the direction in which abrasive will scatter, so that the cover 32 can reliably receive the abrasive scattered. This will be described later by reference to FIG. 4.

Figure 4:
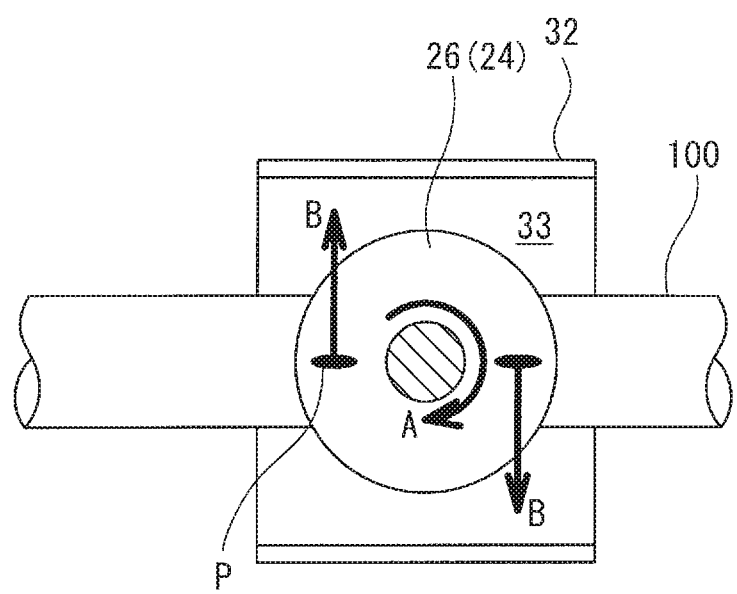
FIG. 4 is a diagram to explain the directions in which abrasive scatters.

FIG. 4 illustrates the cover 32 or other components viewed in the axial direction of the polishing tool 24 to explain the direction in which abrasive scatters. In polishing the outer circumferential face of the workpiece 100 with the end face of the buff 28, the buff 28 is placed in contact with the workpiece 100 on the linear portion P in parallel with the axial line of the workpiece 100. Abrasive will scatter mainly in a tangential direction of this linear portion P. That is, when the polishing tool 24 rotates in the direction indicated by the arrow A in FIG. 4, abrasive will scatter in the directions indicated by the arrow B. In other words, abrasive will scatter mainly in the direction in parallel with the axial line of the workpiece 100 and also the end face of the buff 28. As known from FIG. 4, in the case where the cover 32 is disposed in the position substantially opposed to the polishing tool 24 with the workpiece in-between, a pair of walls constituting the cover 32 are present in the respective directions in which the abrasive will scatter with the workpiece 100 in-between. This effectively prevents leakage of abrasive to outside the cover 32.

In a polishing process, the position and posture of the polishing tool 24 are gradually changed. The movement mechanism 30 changes the position and posture of the cover 32 such that the cover 32 appropriately receives the abrasive scattered despite the gradual change in position and posture of the polishing tool 24. This arrangement more effectively prevents leakage of abrasive to outside the cover 32. Moreover, this arrangement in which the cover 32 moves in accordance with the movement of the polishing tool 24 allows use of a smaller cover 43.

As known from the above description, the unnecessary byproduct leakage preventing unit 16 disclosed in this specification has the cover 32 provided separately from the polishing tool 24. Accordingly, as compared with the cover 32 provided to the polishing tool 24 or the polishing head 14, the position and posture of the cover 32 relative to the polishing tool 24 can be set more freely. Further, the cover 32 attached to the polishing tool 24 or the polishing head 14 makes the polishing head 14 bulky and thus likely restricts movement or the like of the polishing tool 24. This can resultantly deteriorate the degree of freedom in a polishing process. Meanwhile, the unnecessary byproduct leakage preventing unit 16 according to this specification does not make the polishing tool 24 bulky, as the cover 32 is provided separately from the polishing tool 24. This arrangement improves the degree of freedom of movement of the polishing tool 24.

As known from the above description, the cover 32 has a shape that is open in three directions. This structure allows the cover 32 to approach the workpiece 100 in the radial direction of the workpiece 100 (from the lateral side) to hold a part of the workpiece 100 in the protection space 33. This approach makes the device usable with workpieces in various shapes. Additionally, this approach allows the cover 32 to have a smaller dimension, as to be described later based on a comparison with a conventional technique. Patent Document 3 describes that a part of a workpiece is held in the cylindrical head body to prevent scattering of swarf. In Patent Document 3, a workpiece is inserted into a round opening formed in the circumferential surface of the head body from the tip end of the workpiece in its axial direction. In this structure, naturally, the round opening into which a workpiece is to be inserted must have a diameter larger than the maximum diameter of the workpiece. Thus, for example, in order to process a workpiece in a shape having a difference in diameter, for example, a workpiece whose end portion has a small diameter and middle portion in the axial direction has a large diameter, the round opening formed in the head body needs to have a large diameter. The head body having such a round opening having a large diameter tends to have a large dimension. Moreover, although a head body having a round opening having a large diameter can appropriately process a large-diameter middle portion of a workpiece in the axial direction, such a head body will leave a large gap relative to the workpiece when processing the small-diameter tip end portion of the workpiece. As a result, leakage of the scattered (swarf or the like) cannot be effectively prevented.

Figure 5:
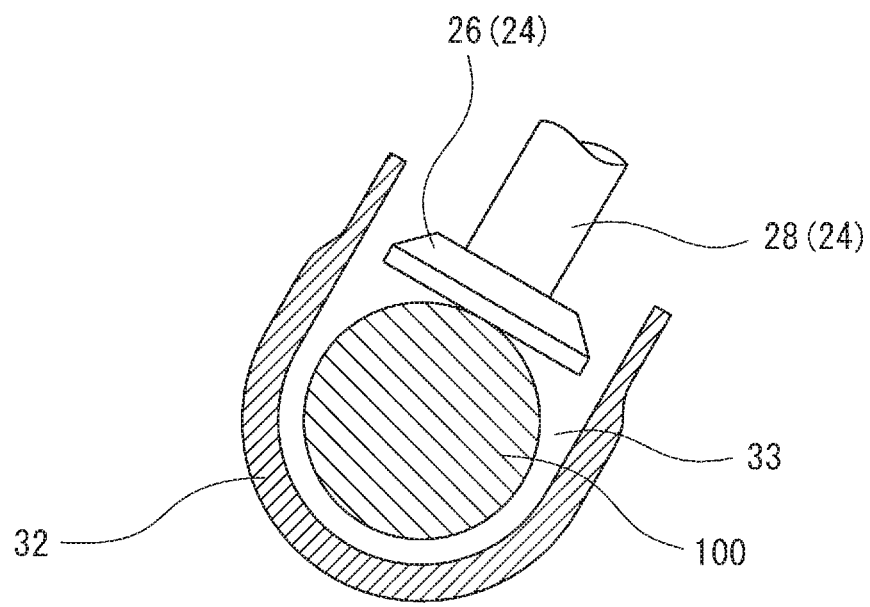
FIG. 5 illustrates a workpiece held on its large-diameter portion in a protection space defined by a cover.
Figure 6:
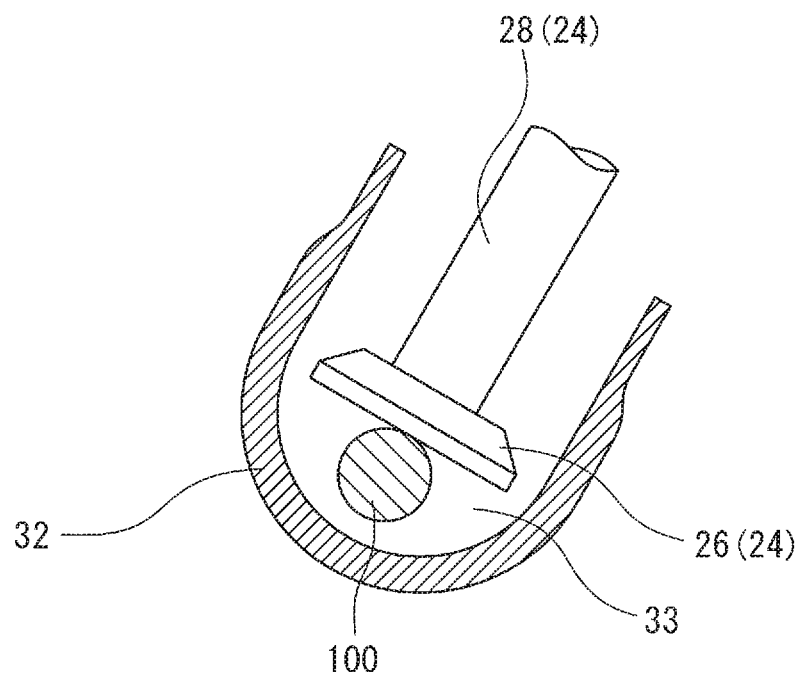
FIG. 6 illustrates a workpiece held on its small-diameter portion in a protection space defined by a cover.

Meanwhile, the cover 32 disclosed in this specification is open in three directions and can approach the workpiece 100 in the radial direction of the workpiece 100. This allows the cover 32 to be positioned close to either of a large-diameter portion and a small-diameter portion of a workpiece having a stepped shape. FIG. 5 illustrates the workpiece 100 held on its large-diameter portion in the protection space 33 of the cover 32, while FIG. 6 illustrates the workpiece 100 held on its small-diameter portion. As illustrated in FIG. 5 and FIG. 6, in the case of the cover 32 that is open in three directions, the cover 32 can be disposed in different positions depending on the diameter of the workpiece 100 to be processed. That is, the cover 32 can be positioned close enough to the workpiece 100, leaving only a small gap between the cover 32 and the workpiece 100. As a result, it is possible to effectively prevent leakage of abrasive to outside the cover 32 also in processing a workpiece having a projection and/or a recession. Moreover, as compared with a case in which a round opening having a large diameter is formed in the circumferential surface of the cylindrical body, the cover 32 that is open in three directions can have a smaller dimension.

Note that the above-described structures are mere examples. The structures other than the cover 32 that is open in three directions and the movement mechanism 30 that moves the cover 32 may be desirably changed. For example, particular unnecessary byproducts to be prevented from leaking, while only abrasive for use in a polishing process is mentioned in the above, may be any wastes or directed-energy generated at or around a part of the workpiece 100 being processed, other than abrasive. For example, the particular unnecessary byproducts can be processing wastes (for example, swarf or metal powder) separated from a workpiece in a cutting process or a grinding process. In this case, the processing head disposed opposed to the cover 32 is a main tool shaft or a tool post that holds a tool for cutting or a grinding head that holds a tool for grinding (a grindstone). Alternatively, the particular unnecessary byproducts to be received by the cover 32 may be substances (processing aids) supplied to and around a workpiece for processing. Processing aids may include, for example, abrasive for use in a polishing process, abrasive grains separated from a grindstone in a grinding process, a shot (blasting material) supplied in a shot peening process, powder supplied to a workpiece in selective laser sintering, or coolant liquid or the like supplied in a cutting process or a grinding process. Note that shot peening is a processing method of propelling metal particles called shots (blasting material) toward; that is, to collide against, a workpiece 100; in other words, a processing method of propelling small nonferrous metal balls against a metal surface at a high speed, to harden the workpiece or to transform the metal structure. Selective laser sintering is a processing method of melting to sinter thermoplastic resin powder or alloy powder by laser or discharging to thereby create a solid structure. Still alternatively, the particular unnecessary byproduct to be received by the cover 32 may be directed-energy used in processing. For example, the particular unnecessary byproducts to be received by the cover 32 may be a laser beam deviated and leaked from the workpiece 100 in a laser process.

Figure 7:
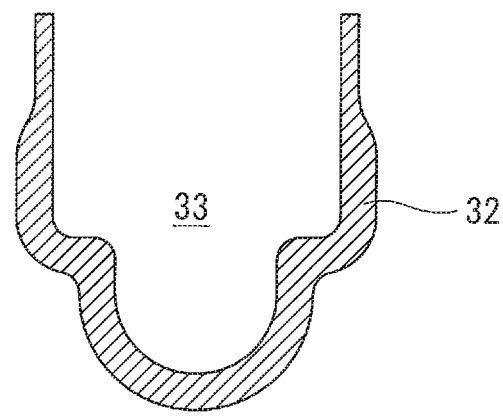
FIG. 7 illustrates another example of a cover.
Figure 8:
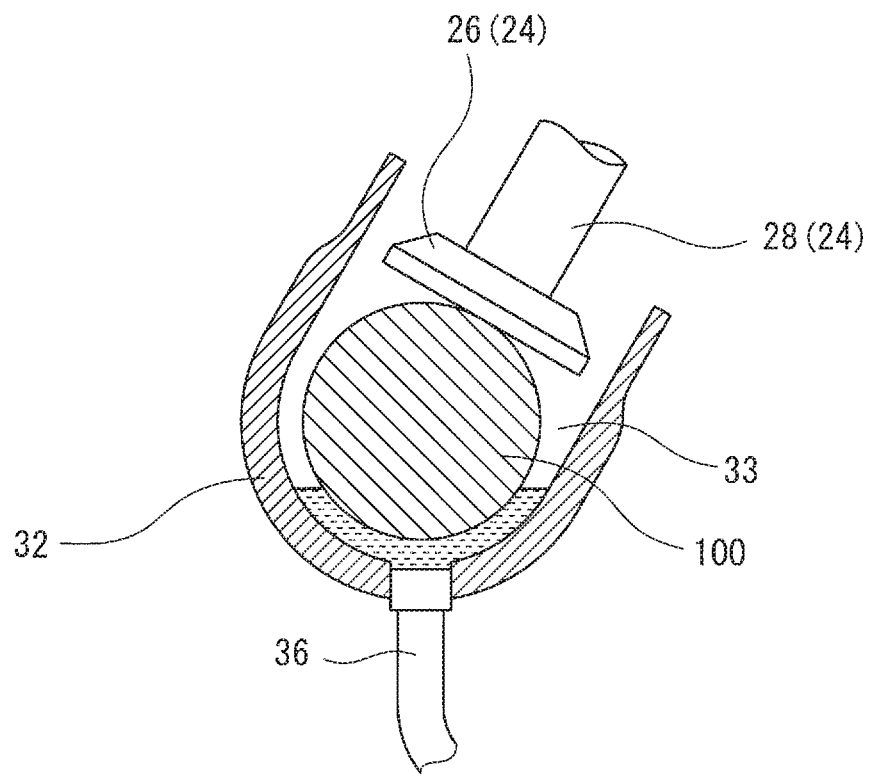
FIG. 8 illustrates an example of an unnecessary byproduct leakage preventing unit.
Figure 9:
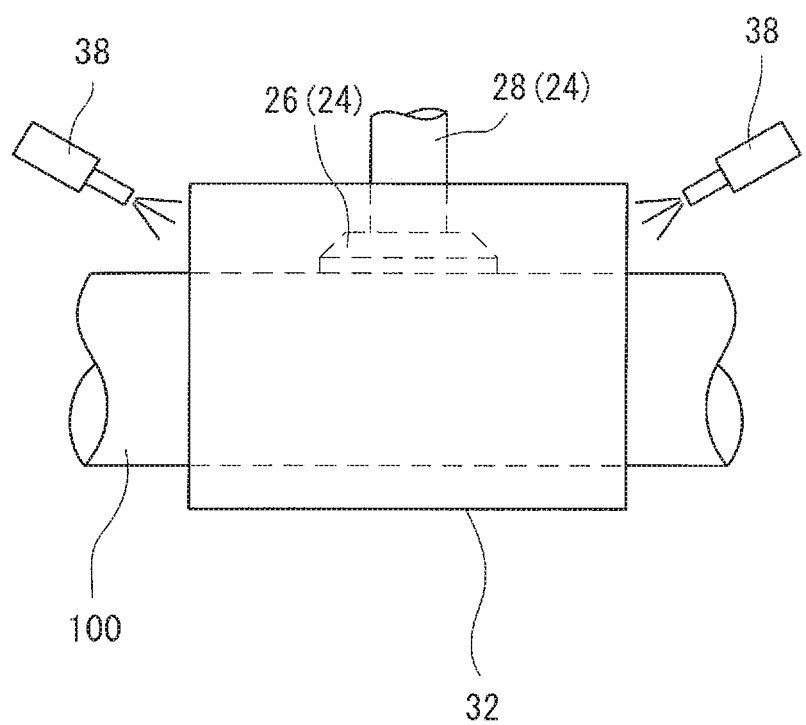
FIG. 9 illustrates another example of an unnecessary byproduct leakage preventing unit.

The cover 32, having a substantially U-shaped cross section in the above description, may have any other shapes that are open in three directions. For example, the cover 32 may have a substantially V-shaped or inverted C-shaped cross section. Alternatively, as illustrated in FIG. 7, the cover 32 may have a shape that continuously or stepwisely becomes wider from the bottom to upper portion.

In the case in which the particular unnecessary byproduct to be received by the cover 32 is liquid or particles in liquid, the unnecessary byproduct leakage preventing device 16 may have a liquid collecting mechanism 36 that discharges the liquid accumulated in the bottom of the cover 32 to outside the cover 32 to be collected. The liquid collecting mechanism 36 may include, for example, a collecting hose in communication with the bottom of the cover 32 and a storage tank (not illustrated) in communication with the collecting hose. Liquid that makes a particular unnecessary byproduct can be, for example, coolant to be supplied in a cutting process. Liquid with particles therein can be, for example, liquid abrasive or waste liquid resulting from washing off pasted abrasive on the workpiece 100 or the like with a cleaning solution.

In the case in which the particular unnecessary byproduct to be received by the cover 32 contains at least one of the wastes removed from a workpiece by a tool in processing and the processing aid that is liquid or powder particles supplied to and around a workpiece for processing, the unnecessary byproduct leakage preventing device 16 may include a fluid injecting mechanism 38 that injects fluid from an end portion of the cover 32 to inside the protection space 33 to thereby prevent leakage of the particular unnecessary byproducts from the end portion of the cover 32. The fluid to be injected may include gas, such as air, or liquid, such as a cleaning solution. To inject liquid, it is preferable to provide the above-mentioned liquid collecting mechanism 36 as well. An injection nozzle that injects fluid may move together with or independent of the cover 21. Provision of the fluid injecting mechanism 38 that injects fluid to inside the protection space 33 can more effectively prevent leakage of particular unnecessary byproducts to outside the cover 32.

Figure 10:
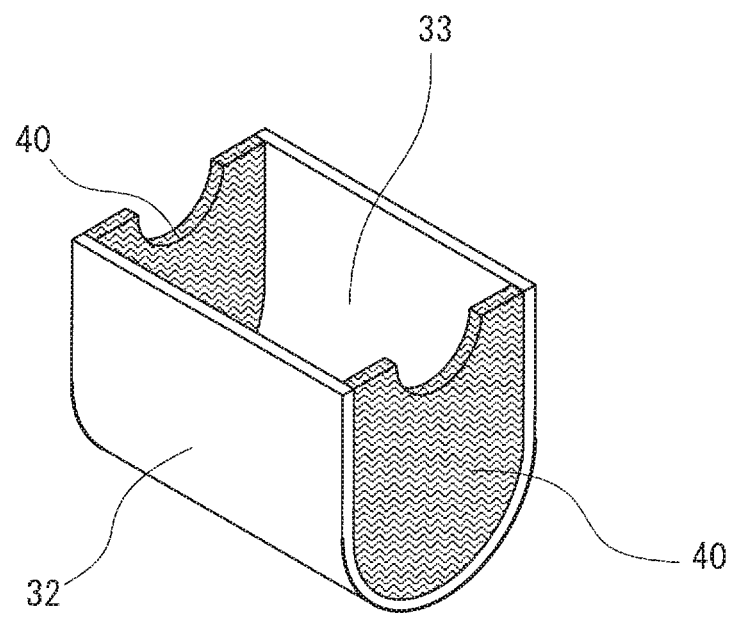
FIG. 10 illustrates still another example of an unnecessary byproduct leakage preventing unit.

As illustrated in FIG. 10, the unnecessary byproduct leakage preventing device 16 may additionally include an elastic member 40 provided between the cover 32 and the workpiece 100. The elastic member 40 is preferably made of material, for example, soft rubber or sponge, that is easily deformable upon contact with other members. In the example illustrated in FIG. 10, the elastic member 40 has a shape resembling a substantially flat panel and is disposed on each of the respective ends of the cover 32 in the axial direction thereof. The elastic member 40, when touching the circumferential surface of the workpiece 100, deforms in accordance with the shape of the circumferential surface so as to be filled in the protection space 33 of the workpiece 100. Provision of the intervening elastic member 40 can prevent abrasive leakage from the space between the workpiece 100 and the respective ends of the cover 32 in the axial direction thereof. This more reliably prevents leakage of abrasive.

The invention claimed is:

1. A machine tool, comprising:
a workpiece holder for holding a workpiece;
a processing head for processing the workpiece held by the workpiece holder; and
an unnecessary byproduct leakage preventing unit for preventing leakage of a particular unnecessary byproduct that is a waste or directed-energy resulting from processing at or around a part of the workpiece, the part being processed, and
wherein
the unnecessary byproduct leakage preventing unit includes
a cover provided separately from the processing head, the cover having a structure that is open in three directions and that has walls in another three directions such that a protection space where to hold a part of the workpiece is defined, the cover for receiving the particular unnecessary byproduct, and
a movement mechanism for moving the cover so as to stay apart from the workpiece while the workpiece is not processed and so as to have a part of the workpiece held in the protection space while the workpiece is being processed.

2. The machine tool according to claim 1, wherein the movement mechanism includes a drive source that is different from a drive source for the workpiece and a drive source for the processing head and moves the cover, interlocking with movement of the processing head, while the workpiece is being processed.

3. The mechanical tool according to claim 1, wherein
the workpiece holder holds one or both respective end portions of the workpiece in an axial direction of the workpiece,
the processing head approaches the workpiece substantially in a radial direction of the workpiece, and
the movement mechanism causes the cover to approach the workpiece substantially in the radial direction of the workpiece such that the cover is positioned substantially opposed to the processing head with the workpiece in-between.

4. The machine tool according to claim 1, wherein the cover has any of a substantially U-shaped cross section, a substantially V-shaped cross section, and a substantially inverted C-shaped cross section.

5. The machine tool according to claim 1, wherein the unnecessary byproduct leakage preventing unit has an elastic member provided to the cover and to be closely adhered to the part of the work, the part being held in the protection space.

6. The machine tool according to claim 1, wherein the particular unnecessary byproduct includes at least one of a processing waste removed from the workpiece being processed and a processing aid that is liquid or powder particles supplied to the workpiece and therearound for processing.

7. The machine tool according to claim 6, wherein the unnecessary byproduct leakage preventing unit further includes an injection mechanism for injecting fluid from a space between the cover and the workpiece or a space between the cover and the processing head to inside the protection space to thereby prevent leakage of the particular unnecessary byproduct from the space.

8. The machine tool according to claim 6, wherein
the particular unnecessary byproduct is liquid or powder particles blended in liquid, and
the unnecessary byproduct leakage preventing unit further includes a liquid collecting mechanism for collecting liquid received by the cover.

9. The machine tool according to claim 1, wherein
the machine tool is a multi-tasking machine including a processing head built in a lathe, the processing head for polishing or grinding a workpiece, the lathe for turning the workpiece,
the processing head is a polishing head for holding a polishing tool for polishing the workpiece or a grinding head for holding a grindstone for grinding the workpiece, and
the particular unnecessary byproduct is abrasive supplied for polishing or abrasive grains removed from the grindstone.

10. The machine tool according to claim 9, wherein the movement mechanism moves the cover with at least four degrees of freedom including straight movements in a Z axial direction in parallel with a workpiece main shaft, an X axial direction orthogonal to the Z axial direction, and a Y axial direction orthogonal to the Z axial direction and the X axial direction, and rotation movement around an axis in parallel with at least one of the X axial direction, the Y axial direction, and the Z axial direction.

11. The machine tool according to claim 1, wherein the movement mechanism is a multiple-joint robot mounted in a processing chamber.

* * * * *